United States Patent
De Boer et al.

(10) Patent No.: US 8,051,713 B2
(45) Date of Patent: Nov. 8, 2011

(54) TWO-DIMENSIONAL ADAPTIVE ACCELEROMETER BASED ON DIELECTROPHORESIS

(75) Inventors: Bart Michiel De Boer, Eindhoven (NL); Ivon Franciscus Helwegen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 283 days.

(21) Appl. No.: 12/067,306

(22) PCT Filed: Sep. 19, 2006

(86) PCT No.: PCT/IB2006/053370
§ 371 (c)(1), (2), (4) Date: Mar. 19, 2008

(87) PCT Pub. No.: WO2007/034409
PCT Pub. Date: Mar. 29, 2007

(65) Prior Publication Data
US 2008/0202240 A1    Aug. 28, 2008

(30) Foreign Application Priority Data

Sep. 22, 2005 (EP) .................................. 05108748
Aug. 14, 2006 (EP) .................................. 06118887

(51) Int. Cl.
*G01P 15/00* (2006.01)

(52) U.S. Cl. ................... 73/514.16; 73/514.06

(58) Field of Classification Search ............... 73/500, 73/504.05, 504.12, 514.06, 514.08, 514.16
See application file for complete search history.

(56) References Cited

U.S. PATENT DOCUMENTS

| | | | | | |
|---|---|---|---|---|---|
| 3,488,531 | A | * | 1/1970 | Rosensweig | 310/10 |
| 3,508,445 | A | * | 4/1970 | Gagnon et al. | 73/514.12 |
| 3,516,294 | A | * | 6/1970 | Schmieder | 73/514.08 |
| 4,043,204 | A | * | 8/1977 | Hunter et al. | 73/514.08 |
| 4,047,439 | A | * | 9/1977 | Russell et al. | 73/514.08 |
| 4,692,614 | A | * | 9/1987 | Wilson et al. | 250/231.1 |
| 4,922,753 | A | * | 5/1990 | Idogaki et al. | 73/514.08 |
| 5,007,292 | A | * | 4/1991 | Crowe et al. | 73/654 |
| 5,489,515 | A | * | 2/1996 | Hatschek et al. | 435/29 |
| 7,284,431 | B1 | * | 10/2007 | Barger | 73/514.32 |
| 7,449,342 | B2 | * | 11/2008 | Kane et al. | 436/180 |
| 2002/0104379 | A1 | * | 8/2002 | Ried et al. | 73/514.32 |
| 2004/0146434 | A1 | * | 7/2004 | Kane et al. | 422/100 |
| 2004/0172078 | A1 | * | 9/2004 | Chinchoy | 607/17 |
| 2005/0193801 | A1 | | 9/2005 | Simonenko et al. | |
| 2007/0071652 | A1 | * | 3/2007 | Cherng et al. | 422/100 |
| 2009/0156249 | A1 | * | 6/2009 | Ruckart | 455/550.1 |

* cited by examiner

*Primary Examiner* — Hezron E Williams
*Assistant Examiner* — Samir M Shah
(74) *Attorney, Agent, or Firm* — Larry Liberchuk (57) ABSTRACT

Conventional accelerometers are based on test masses that are suspended in some kind of spring damper system. According to an exemplary embodiment of the present invention, a two-dimensional adaptive accelerometer based on dielectrophoresis is provided, which measures an acceleration of a test mass freely floating in a medium by determining the movement of the test mass due to an accelerating force acting on the test mass. A non-uniform electric force field provides for a wide and adjustable dynamic range.

19 Claims, 5 Drawing Sheets

TWO-DIMENSIONAL ADAPTIVE ACCELEROMETER BASED ON DIELECTROPHORESIS

The invention relates to the field of acceleration measurements. In particular, the invention relates to a dielectrophoretic accelerometer for determining an acceleration acting on a test mass, to a use of an accelerometer inside a camcorder, to a use of an accelerometer inside a portable audio player, a method of determining an acceleration acting on a test mass by a dielectrophoretic accelerometer, a computer-readable medium, and a program element.

Conventional accelerometers are based on proof or test masses that are suspended in some kind of spring damper system. The spring damper system serves as a restoring mechanism. The deviation of the proof mass from the initial position, which can be measured in various ways, is proportional to the applied acceleration. Especially small, for example micrometer sized MEMS (Micro Electromechanic System) accelerometers are difficult to manufacture, requiring complex micromachining to produce a suitable spring system.

Because the masses and springs are fixed, conventional accelerometers are not adaptive, i.e. the measurable acceleration range cannot be changed once the sensor is fabricated. Moreover, they are often approximately linear which may be disadvantageous in case a large dynamic range is required.

It may be desirable to have an improved determination of accelerations.

According to an exemplary embodiment of the present invention, a dielectrophoretic accelerometer for determining an acceleration acting on a test mass may be provided, the accelerometer comprising a cavity filled with a medium, a source for generating a non-uniform force field, a test mass adapted for moving inside the medium and being exposed to the force field, and a detector adapted for detecting a movement of the test mass, wherein the accelerometer is adapted for determining an acceleration of the accelerometer on the basis of the movement of the test mass.

Therefore, an accelerometer is provided, which measures an acceleration of a test mass which is for example freely floating in a medium by determining the movement of the test mass due to an accelerating force acting on the test mass. In particular, this dielectrophoretic accelerometer may be easy to fabricate and used in a wide dynamic range.

According to another exemplary embodiment of the present invention, the non-uniform force field is an electric field, wherein the source comprises a first number of first electrodes and a second number of second electrodes, wherein a corresponding potential difference exists between each first electrode and each second electrode, and wherein the first and second electrodes are adapted for forming the cavity and for generating the non-uniform electric field.

Thus, according to this exemplary embodiment of the present invention, an electric field may be generated by an arrangement of individual positive and negative electrodes, such that the electric field has a certain distribution.

According to another exemplary embodiment of the present invention, each electrode is arranged in an upper horizontal plane or in a lower horizontal plane.

Thus, the electrodes may be produced using standard lithography.

According to another exemplary embodiment of the present invention, the medium has a first dielectric constant and the test mass has a second dielectric constant, which is different from the first dielectric constant.

Therefore, according to this exemplary embodiment of the present invention, a dielectrophoretic force may act on the test mass when the test mass is displaced from a stable, neutral position due to the non-uniform electric field.

According to another exemplary embodiment of the present invention, the detector is adapted for capacitively detecting the movement of the test mass.

For example, the detector may be adapted for measuring a capacity between different electrodes, which capacity changes due to a movement of the test mass between the electrodes.

According to another exemplary embodiment of the present invention, the detector is adapted for detecting the movement of the test mass on the basis of a differential measurement, wherein the movement of the test mass is detected by measuring a first capacity of a first electrode pair and a second capacity of a second electrode pair and by comparing the first capacity with the second capacity.

Therefore, according to this exemplary embodiment of the present invention, a high sensitivity for the acceleration measurement may be provided.

According to another exemplary embodiment of the present invention, the detector is adapted for performing a two-dimensional or a three-dimensional measurement by detecting a first movement of the test mass in a first direction and at least one of a second movement of the test mass in a second direction or a third movement of the test mass in a third direction.

Therefore, according to this exemplary embodiment of the present invention, accelerations in all three spatial directions may be measured.

According to another exemplary embodiment of the present invention, the test mass is a spherical particle.

This may, for example, provide for a symmetrical measurement.

According to another exemplary embodiment of the present invention, the source is adapted for controlling a potential difference between a first electrode and a second electrode, resulting in an adjustment of a force acting on the test mass upon movement of the test mass.

Therefore, according to this exemplary embodiment of the present invention, the accelerometer may be configured according to individual requirements for the measurement.

According to another exemplary embodiment of the present invention, the non-uniformity of the force field results in a logarithmic response of the force acting on the test mass upon movement of the test mass, resulting in a wide dynamic range of the accelerations to be measured.

Therefore, both small and big accelerations may be measured with the same accelerometer.

According to another exemplary embodiment of the present invention, the response can be switched from a non-linear response to a linear response by the source.

Therefore, according to this exemplary embodiment of the present invention, the accelerometer can be individually adjusted according to external conditions.

According to another exemplary embodiment of the present invention, the test mass comprises one of polystyrene, latex, silicon, a first fluid, and a first gas, and the medium comprises one of water, oil, a second fluid, and a second gas.

For example, according to this exemplary embodiment of the present invention, the test mass is a latex or polystyrene sphere placed in water. Another example is a silicon sphere in oil, or a gas bubble in a fluid. Furthermore, according to this exemplary embodiment of the present invention, the test mass may be an oil droplet in water, or any other fluid in some other, second fluid. Furthermore, the test mass may be a first gas disposed in a second gas (as the medium).

This may provide for a whole variety of different accelerometers adapted for different configurations and requirements.

According to another exemplary embodiment of the present invention, the accelerometer may be used inside a camcorder for a video camera for measuring an acceleration inside the camcorder or the video camera.

Furthermore, the accelerometer may be used inside a portable audio player, such as, for example, a portable HDD MP3 player, and may be adapted for detecting when the audio player is falling, to be able to shut it down before it hits the ground such that the device is more likely to survive.

According to another exemplary embodiment of the present invention, a method of determining an acceleration acting on a test mass by a dielectrophoretic accelerometer may be provided, the method comprising the steps of generating, by a source, a non-uniform force field, detecting, by a detector, a movement of the test mass adapted for moving inside a medium and being exposed to the force field, and determining an acceleration of the accelerometer on the basis of the movement of the test mass.

This may provide for an improved determination of accelerations.

According to another exemplary embodiment of the present invention, a computer-readable medium may be provided, in which a computer program of determining an acceleration acting on a test mass by a dielectrophoretic accelerometer is stored which, when being executed by a processor, is adapted to carry out the above-mentioned method steps.

Furthermore, the present invention relates to a program element of determining an acceleration acting on a test mass by a dielectrophoretic accelerometer, which may be stored on the computer-readable medium. The program element may be adapted to carry out the steps which are above-mentioned.

The program element may preferably be loaded into working memories of a data processor. The data processor may thus be equipped to carry out exemplary embodiments of the methods of the present invention. The computer program may be written in any suitable programming language, such as, for example, C++ and may be stored on a computer-readable medium, such as a CD-ROM. Also, the computer program may be available from a network, such as the WorldWideWeb, from which it may be downloaded into image processing units or processors, or any suitable computers.

It may be seen as the gist of an exemplary embodiment of the present invention, that an accelerometer is provided which measures an acceleration of a test mass which is freely floating in a medium by determining the movement of the test mass due to an accelerating force acting on the test mass. According to an exemplary embodiment of the present invention, the test mass is a spherical particle floating in a fluid and having a different dielectrophoretic constant than the fluid. A non-uniform electric field provides for a minimum of electric potential (energetic dip) at a zero position where the test mass is located when no acceleration is acting on it. When the test mass is pushed away from the zero position due to an acceleration, a pull-back force is generated such that the non-zero position of the test mass can be used as a measure for the strength of the acceleration.

BRIEF DESCRIPTION OF THE DRAWINGS

These and other aspects of the present invention will become apparent from and elucidated with reference to the embodiments described hereinafter.

Exemplary embodiments of the present invention will be described in the following, with reference to the following drawings.

FIG. 6 A shows a schematic representation of a cross-sectional view of a accelerometer based on the principle of electrowetting.

FIG. 6 B shows a schematic representation of a top view of the accelerometer corresponding to FIG. 6A

The illustration in the drawings is schematically. In different drawings, similar or identical elements are provided with the same reference numerals.

DETAILED DESCRIPTION OF AN EMBODIMENT

Figure 1:
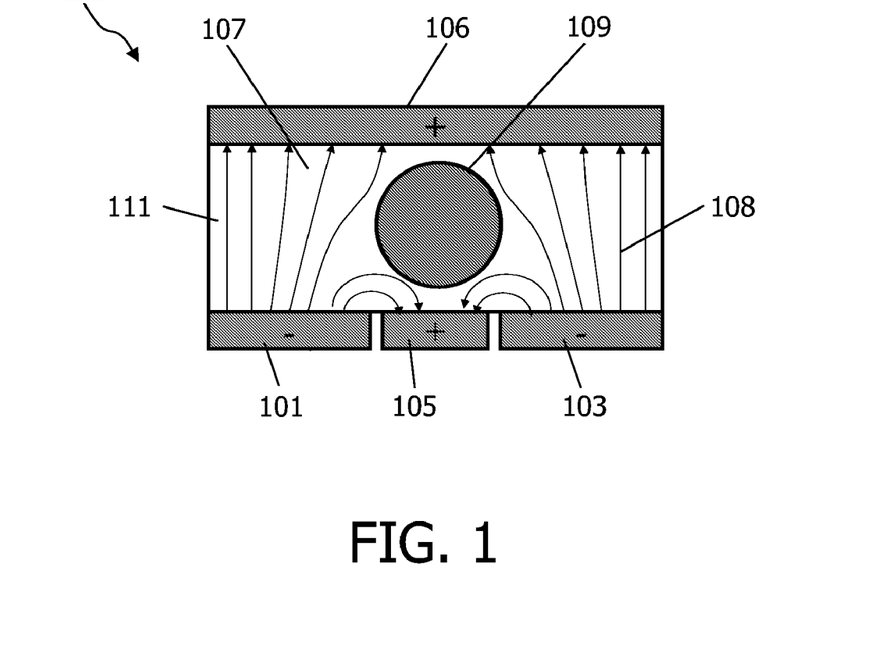
FIG. 1 shows a schematic representation of a cross-sectional view of a dielectrophoretic accelerometer according to an exemplary embodiment of the present invention.
Figure 2:
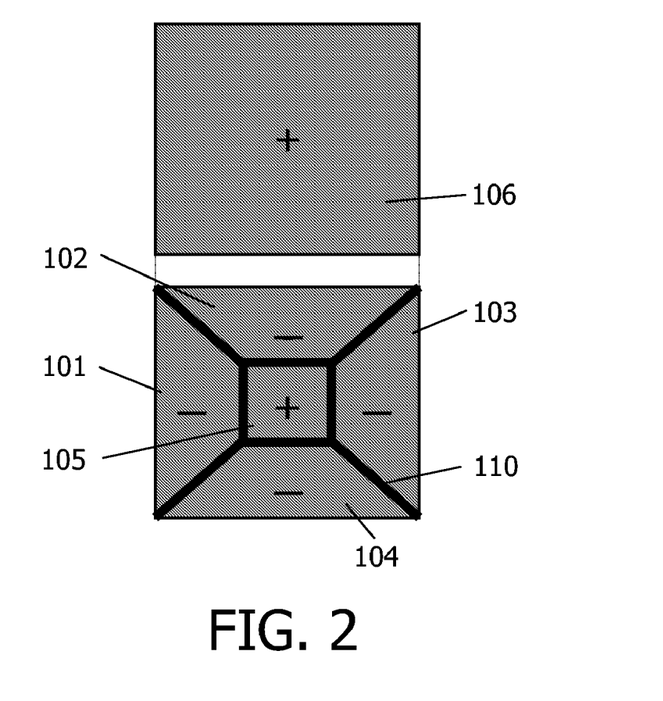
FIG. 2 shows a schematic representation of a plan view of a top electrode and a bottom electrode, according to an exemplary embodiment of the present invention.

FIG. 1 shows a schematic representation of a cross-sectional view of a dielectrophoretic accelerometer according to an exemplary embodiment of the present invention. FIG. 2 shows a schematic representation of a plan view of a top electrode and a bottom electrode according to the exemplary embodiment depicted in FIG. 1.

As may be seen from FIGS. 1 and 2, the dielectrophoretic accelerometer 100 comprises bottom electrodes 101, 102, 103, 104, 105 and a top electrode 106. Between the bottom electrodes 101 to 105 and the top electrode 106 a fluid 107 is disposed, having a density $\rho_m$ and a dielectric constant $\in_m$. Furthermore, a spherical particle 109 with a density $\rho_p$ and a dielectric constant $\in_p$ is disposed in the fluid 107 between the bottom electrodes 101 to 105 and the top electrode 106.

A potential difference is applied between electrodes 101 to 104 and electrodes 105 to 106, resulting in a non-linear electric field which is symbolized by electric field lines 108.

The accelerometer 100 is based on dielectrophoresis as a restoring mechanism. It may be, according to an exemplary embodiment of the present invention, adapted as a two-dimensional accelerometer, which is able to simultaneously measure accelerations in two different directions (e.g. in a first direction perpendicular to the image plane of FIG. 1 and in a second direction along a horizontal line in FIG. 1, which both lie in the image plane of FIG. 2).

This two-dimensional functionality (or even three-dimensional functionality) may be realized by a respective arrangement of the top and bottom electrodes 101 to 106 (and even further electrodes), such that a two-dimensional or even three-dimensional movement of the test mass 109 can be detected and reversed.

Dielectrophoresis (DEP) is the movement of a material or an object caused by a spatially non-uniform electrical field. Neutral but polarizable particles experience, in response to the spatially non-uniform electric field, a net force which is directed toward locations with increasing or decreasing field intensity according to the physical properties of particle and medium. In the first case the force is called positive dielectrophoresis while in the second case the force is called negative dielectrophoresis.

Completely distinct from the phenomenon of electrophoresis, DEP only arises when the object has a different tendency to become electrically polarized relative to its surroundings. If the object is more polarizable than its surroundings, it will be pulled towards higher field regions (which effect is called positive DEP). Conversely, it will be repelled towards weak field regions (which effect is called negative DEP) if it is less polarizable. The DEP force which acts on a spherical particle due to an imposed electrical field can be written as $$\vec{F}(t)=2\pi\in_0\in_m r^3 \alpha \nabla \vec{E}_{RMS}^2$$

wherein r is the radius of the particle, $E_{RMS}$ is the RMS value of the electric field (assuming a sinusoidal time dependence), and α the real part of what is called the Clausius-Mosotti vector, which is given by $$\alpha = \text{Re}\left(\frac{\varepsilon_p^* - \varepsilon_m^*}{\varepsilon_p^* + 2\varepsilon_m^*}\right)$$

wherein the star (*) denotes that the dielectric constant is a complex.

DEP may be used to concentrate a material in the center of a small chamber filled with two materials having different dielectric constants ∈. An example of embodiment is depicted in FIGS. 1 and 2, where a chamber 111 is shown that is enclosed by walls having a number of electrodes 101 to 106. These electrodes may be electrically isolated from the media 107, 109 inside the chamber 111. However, it should be noted that the electrodes 101 to 106 do not have to be electrically isolated from the media 107, 109 inside the chamber 111.

The chamber 111 with associated electrodes 101 to 106 may be produced easily (and thus cheaply). For example, the electrodes 101 to 105 are located in a first horizontal plane and the top electrode 106 is located in a second horizontal plane and can thus be produced using standard lithography processing techniques.

For example, a spherical particle with low dielectric constant $\in_r$ and a density ρ higher than 1000 kg/m³ (which is the density of water) is surrounded by water (which has a high $\in_r$ of 80). When a negative potential is applied to electrodes 101 to 104 and a positive potential is applied to electrodes 105 and 106, a so-called DEP-cage is formed that will trap the particle 109 in the middle of the chamber 111. The dielectrophoretic force thus fulfils the function of the springs used in conventional accelerometers.

It should be noted that in case the dielectrophoretic accelerometer is of small (micro) size, the chamber 111 may not even have to be surrounded by a closed housing, since the fluid 107 between the electrodes 101-106 is stored in place by its surface energy.

It should further be noted that the electrodes 101-105 and 106 do not have to be arranged in respective planes but may be arranged in different arrangements and may be of different shape as the shapes depicted in FIG. 2. For example, the top electrode 106 may not be plane, thereby increasing the non-linearity of the electric field 108.

FIG. 2 shows a schematic representation of a plan view of a top electrode and bottom electrodes according to an exemplary embodiment of the present invention. As may be seen from FIG. 2, the top electrode 106 may be of rectangular shape. The arrangement of bottom electrodes 101 to 105 as the same, corresponding rectangular shape but consists of five different electrodes 101 to 105. A potential difference exists between electrodes 101 to 104 and electrodes 105 to 106. Furthermore, the electrodes 101 to 105 are electrically isolated from each other by trenches 110 (or any other form of isolation).

Figure 3:
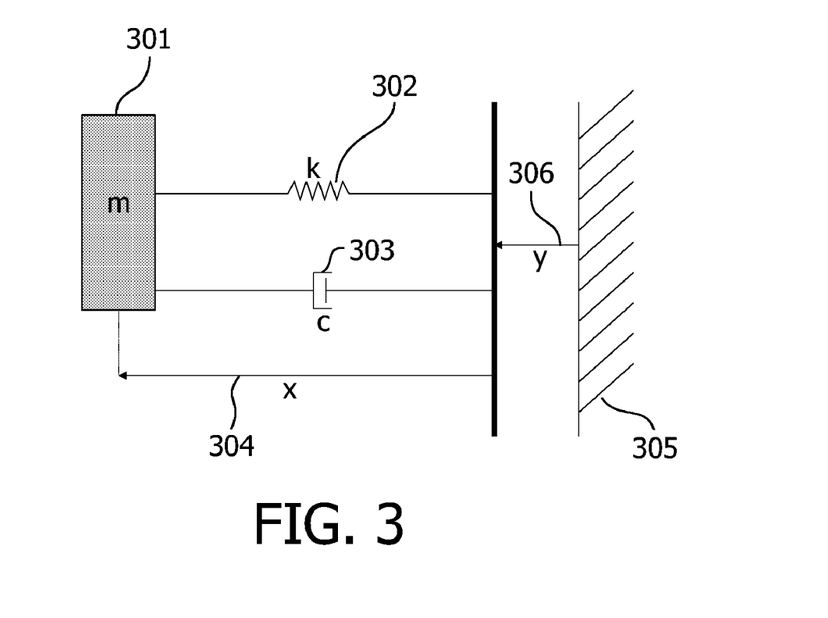
FIG. 3 shows a schematic representation of a system model.

The accelerometer may be approximated by the system depicted in FIG. 3, where mass 301 (m) is the difference between the mass of the particle 109 and the mass of an equal volume of the surrounding fluid (as the position of the particle is changed an equal volume of fluid is displaced), i.e. m=$(\rho_{particle}-\rho_{fluid})$*volume.

The spring constant 302 (k) represents the dielectrophoretic force (the self-restoring mechanism). Damper constant 303 (c) represents the viscosity of the fluid. X 304 is the position of the particle in the chamber, while Y 306 is the position of the chamber in the (fixed) world 305.

The transfer function for this system is $$\frac{x}{y} = \frac{-s^2}{ms^2 + cs + k}.$$

The position of the particle as function of the applied acceleration (a=$s^2$y) is thus given by $$\frac{x}{a} = \frac{-1}{ms^2 + cs + k}.$$

This model is no different from a model describing conventional accelerometers. However, k may, as opposed to conventional accelerometers, be adjusted dynamically by merely changing the potential difference between the electrodes. This may allow for an accelerometer that may easily be adjusted in situ to different ranges of accelerations.

Using multiple electrodes with different potentials, an exponential field gradient resulting in a non-linear (for example logarithmic) response may be achieved, allowing for accelerometers with a large dynamic range. An example of such an electrode configuration is shown in FIG. 4.

Figure 4:
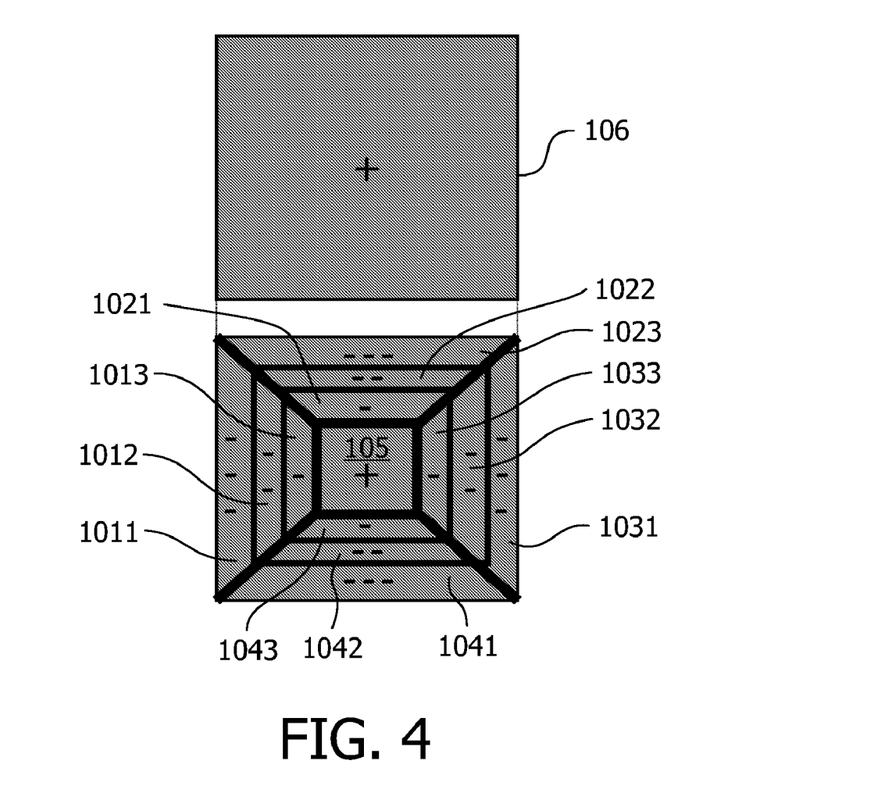
FIG. 4 shows a schematic representation of a plan view of a top electrode and bottom electrodes according to another exemplary embodiment of the present invention.

FIG. 4 shows a schematic representation of a plan view of a top electrode and bottom electrodes according to an exemplary embodiment of the present invention. As may be seen from FIG. 4, the potential difference between the electrodes 1031 to 1033, 1011 to 1013, 1021 to 1023, 1041 to 1043 and electrodes 105 to 106 may decrease for electrodes located nearer to the center of the chamber, since the outer electrodes are provided with a lower (e.g. more negative) potential than inner electrodes. It should be noted, that outer electrodes may be provided with a higher (e.g. more positive) potential than inner electrodes, in the case that electrodes 1031 to 1033, 1011 to 1013, 1021 to 1023, 1041 to 1043 have a higher potential than electrodes 105 to 106.

Applying a fluid with a desired viscosity may allow for the control of the value of damper c. Mass m can be controlled by applying a particle with the desired density and volume and a fluid with a desired density. Both particle and fluid may be inserted after fabrication of the chamber with electrodes. The particle may, according to an exemplary embodiment of the present invention, be thrown in the chamber at random, as the system aligns itself automatically upon application of the voltages on the electrodes, i.e. activation of the spring system. The choice for a certain combination of particle and fluid does not influence the design of the chamber, so that the same chamber may be used to produce accelerometers with different responses, i.e. custom made accelerometers may be produced.

In the following, an acceleration measurement procedure is described in more detail.

Position x is (for low frequencies) proportionally related to the applied acceleration. However, other relations between position x and the applied acceleration may exist, according to the geometry of the electrode arrangement and to the respective potentials of the electrodes.

The displacement x of the particle from the center of the volume can be measured using the same electrodes as discussed earlier.

By applying AC voltage far beyond the cut-off frequency of the mechanical system, and subsequently measuring the current, the value of the capacitance formed by the opposing electrodes (top and bottom) and the dielectric in between can be measured. When the particle moves between the electrodes as a result of an applied acceleration, the dielectric constant of the capacitor is changed, thus changing the different capacitor values. A differential measurement may be performed by comparing the values of the capacitors formed by electrode pairs 101 and 106, 102 and 106, 103 and 106, 104 and 106 with the capacitor formed by electrode pair 105 and 106. This may make the measurement independent of absolute values of the capacitors.

Assuming a volume with a height g=1 mm. To obtain an appropriate chamber, the length and width of the electrodes may be in the same order of magnitude as the height of the chamber. When taking all dimensions the same, the capacitance between an electrode pair can be calculated using $$C = \frac{A\varepsilon}{d} = d\varepsilon.$$

The maximum change in capacitance due to displacement of a polystyrene particle ($\varepsilon$=2.5) in water ($\varepsilon_r$=80) is then $$\Delta C = d\Delta\varepsilon_r\varepsilon_0 = 1\cdot 10^{-3}\cdot(80-2.5)\cdot 8.85\cdot 10^{-12} = 0.69 \text{ pF},$$

i.e. $C_{max}$=0.708 pF and $C_{min}$=0.022 pF. When using a frequency of 10 MHz, this corresponds to a maximum change in impedance from 723 kOhm to 22.47 kOhm.

In the following, exemplary embodiments of the present invention will be further described.

Figure 5:
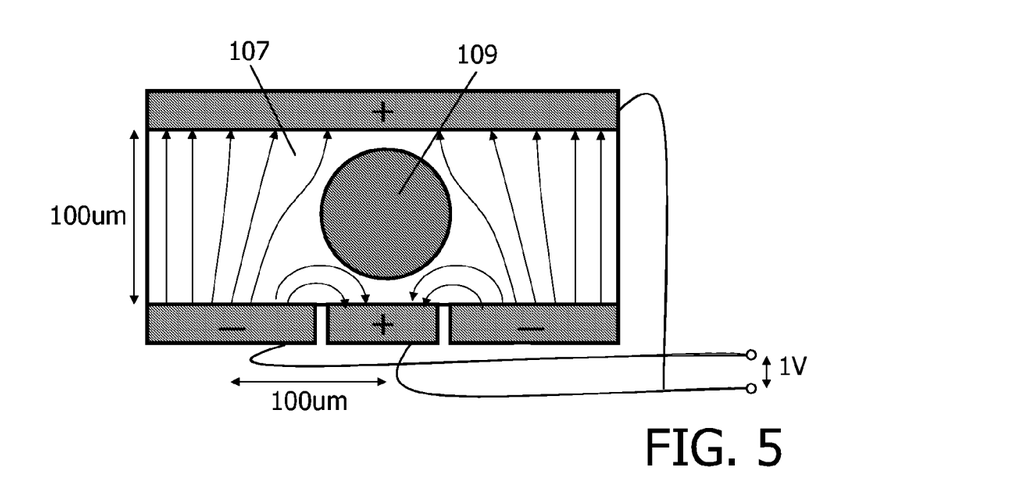
FIG. 5 shows a schematic representation of a cross-sectional view of a dielectrophoretic accelerometer according to another exemplary embodiment of the present invention.

According to the first embodiment, the accelerometer comprises latex or polystyrene sphere(s) in water. Assuming a polystyrene sphere ($\rho$=1060 kg/m$^2$, $\varepsilon_r$=2.5, r=40 µm) in water ($\rho$=1000 kg/m$^2$, viscosity $10^{-3}$ Pas, $\varepsilon_r$=80) in a chamber with d=100 µm (=height of the chamber and length and width of the bottom electrodes). Assuming furthermore that the DC voltage applied between the top electrode 106 and the bottom electrodes 101-104 is 1V, while bottom electrode 105 has the same potential as the top electrode 106. The maximum electric field is thus 1V/100 µm=10$^4$V/m. The minimum field (in the center of the chamber) is 0V/m. The distance between the centers of the bottom electrodes is 100 µm, which is more or less the distance between the field maximum and minimum as well as the maximum displacement of the particle. The gradient of the squared field is then $10^8/10^{-4}=10^{12}$.

This is depicted in FIG. 5.

Considering the steady state situation, i.e. a constant acceleration is applied, the acceleration required to obtain a full swing displacement (e.g. 100 µm) of the particle form the center position, i.e. the measurable acceleration range, may be calculated. In the steady state the dielectrophoretic force is equal to the force on the particle as a result of the acceleration.

$$F_{acc}=ma=(\rho_1-\rho_2)va=(\rho_1-\rho_2)(4/3)\pi r^3 a$$

$$F_{DEP}=2\pi\varepsilon_0\varepsilon_m r^3\alpha\nabla\vec{E}_{RMS}^2$$

$$F_{acc}=F_{DEP}$$

From that it follows $$a = 2\pi\varepsilon_0\varepsilon_m r^3\alpha\nabla\vec{E}_{RMS}^2/(\rho_1-\rho_2)(4/3)\pi r^3 =$$
$$\frac{3\varepsilon_0\varepsilon_m}{2(\rho_1-\rho_2)}\left(\frac{\varepsilon_p^*-\varepsilon_m^*}{\varepsilon_p^*+2\varepsilon_m^*}\right)\nabla\vec{E}_{RMS}^2 = -8.4 \text{ m/s}^2$$

Note that the measurable acceleration does not depend on the particle size. Only the densities and dielectric constants matter. For the actual measurement the size of the particle is important, as it determines the maximum change in capacitance. However, using differential measurement techniques makes the size again insignificant as long as a measurable capacitance change is achieved.

According to a second embodiment of the present invention, silicon sphere(s) are used in oil. In this embodiment there is only a potential difference between electrodes 105 and 106. This may result in the silicon sphere(s) ($\rho$=2330 kg/m$^3$, $\varepsilon_r$=12) being attracted to the center of the chamber (where the field is highest).

Note that a large number of spheres suspended in oil ($\rho$=800 kg/m$^3$, viscosity 1 Pas, $\varepsilon_r$=2.2) and a potential difference between electrodes 101-104 and 106 may work equally well. In this case the spheres are attracted away from the center.

According to a third embodiment of the present invention, two fluids are used as test mass and medium. For example a drop of oil (e.g. $\rho$=800 kg/m$^3$, viscosity 1 Pas, $\varepsilon_r$=2.2) in water ($\rho$=1000 kg/m$^3$, viscosity $10^{-3}$ Pas, $\varepsilon_r$=80)

According to a fourth embodiment of the present invention, gas in a fluid may be used. An air bubble ($\rho$=1.3 kg/m$^3$, viscosity 17.1 µPas, $\varepsilon_r$=1) in water ($\rho$=1000 kg/m$^3$, viscosity $10^{-3}$ Pas, $\varepsilon_r$=80) can for instance be used. The lower $\varepsilon_r$ of air will result in the air bubble being drawn to the center of the chamber, while the large difference in density will result in a displacement of the bubble in the direction of the applied acceleration.

According to a fifth embodiment of the present invention, two gasses may be used. For example, this embodiment may even provide for a temperature sensor since the gasses may diffuse (or mix) more with increasing temperature, which may result in a common mode signal (change in all capacitances simultaneously) that is a measure for absolute temperature.

The principle of electrowetting may be used to center the test mass in the middle of the chamber. The electrowetting effect is defined as the change in solid electrolyte contact angle due to an applied potential difference between the solid and the electrolyte. Electrowetting is essentially a phenomenon whereby an electric field can modify the wetting behavior of a droplet in contact with an insulated electrode. If an electric field is applied non-uniformly then a surface energy gradient is created which can be used to manipulate a droplet sandwiched between two plates.

Figure 6A:
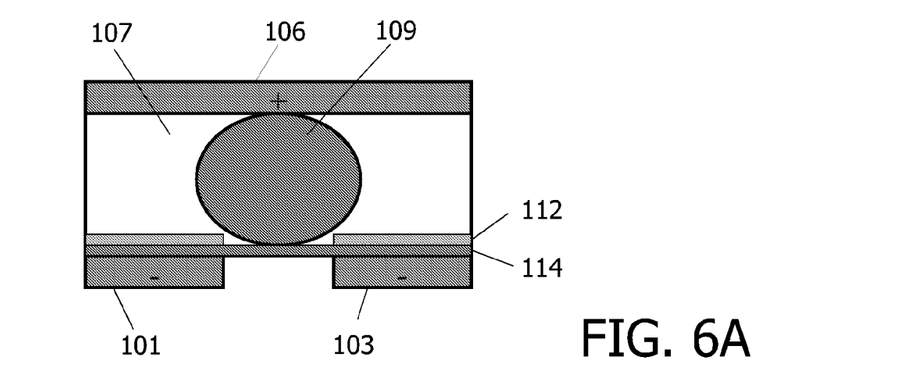
Figure 6B:
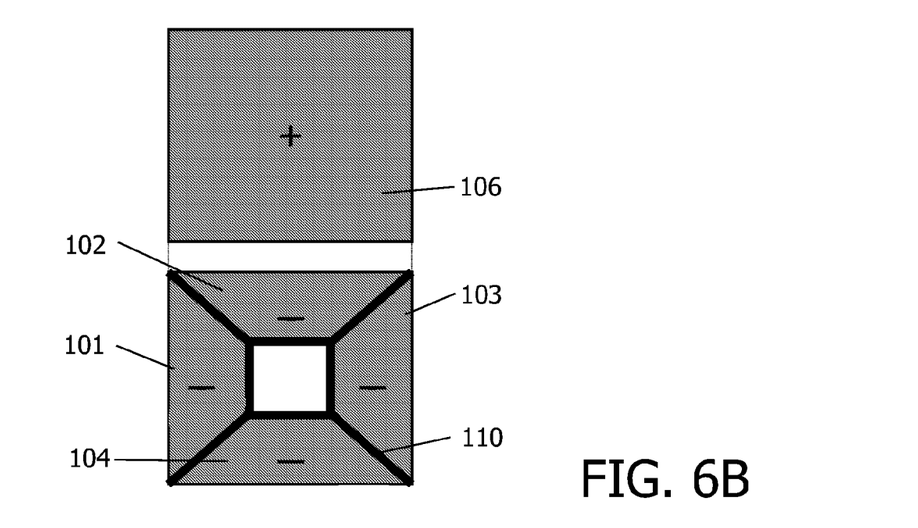

In FIGS. 6A and 6B an advantageous embodiment of a droplet in contact with an insulating layer 111 is shown. In this example an oil droplet (e.g. $\rho=800$ kg/m$^3$, viscosity 1 Pas, $\in_r=2.2$) in water ($\rho=1000$ kg/m$^3$, viscosity $10^{-3}$ Pas, $\in_r=80$) is shown in cross-sectional view (FIG. 6A) and in top view (FIG. 6B). When a (DC or AC) potential difference is applied between electrodes 1 to 4, which are isolated from the water by an insolating layer 111 such as parilene, and top electrode 6, which is in contact with the (conducting) water, the electrowetting principle centers the oil droplet in the middle of the chamber. I.e. the dipoles in the water will move towards the bottom electrodes 1 to 4 and as a consequence the oil droplet is displaced towards the center of the chamber.

Optionally an hydrophobic layer 112 may be used to further improve the electrowetting effect.

Electro wetting thus fulfils the function of the springs used in conventional accelerometers.

Similarly as previously described, the accelerometer can be approximated by the system depicted in FIG. 3, where mass m is the difference between the mass of the oil droplet and the mass of an equal volume of the surrounding water (as the position of the droplet is changed an equal volume of water is displaced), i.e. m=$(\rho_{oil}-\rho_{water})$v.

The spring constant k represents the electrowetting force (the self restoring mechanism). Damper constant c represents the viscosity of the water. X is the position of the oil droplet in the chamber, while y is the position of the chamber.

The spring constant k can, as opposed to conventional accelerometers, be adjusted dynamically by merely changing the potential difference between the electrodes. This allows for an accelerometer that can easily be adjusted in situ to different ranges of accelerations.

Figure 7:
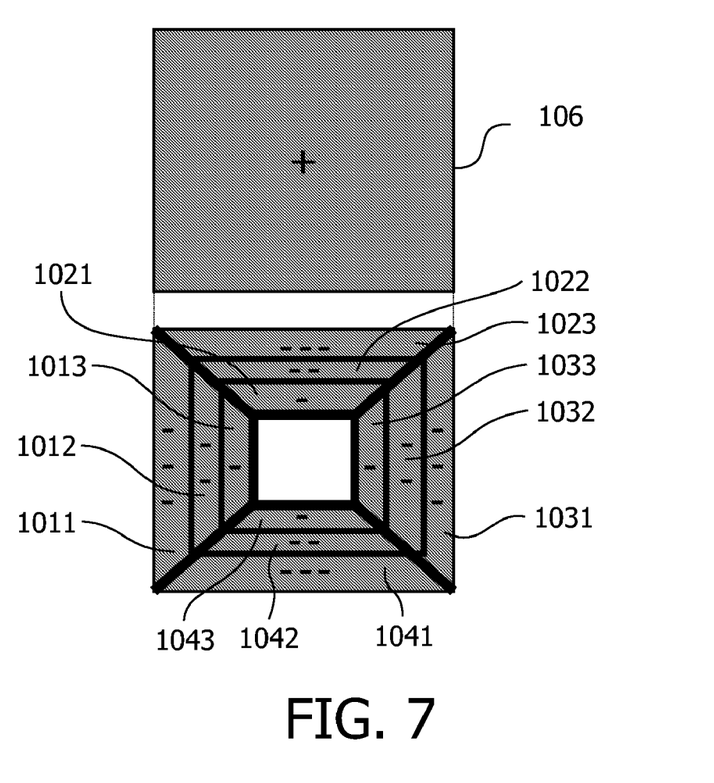
FIG. 7 shows a schematic representation of a plan view of a top electrode and bottom electrodes for large dynamic range accelerometers.

Using multiple electrodes with different potentials, a non-linear (e.g. log) response can be achieved, allowing for accelerometers with a large dynamic range. An example of such an electrode configuration is shown in FIG. 7. The electrode configuration is similar to the one described in FIG. 4, except that the bottom electrode 105 is missing. As indicated already in the embodiment of FIG. 4, the potential of the electrodes should decrease for electrodes located nearer to the center of the chamber.

Using surrounding fluid mixtures other than water (but also with high $\in_r$) with a desired viscosity allows for the control of the value of damper c.

Mass m can be controlled by applying a (oil) droplet with the desired density and volume and a surrounding fluid mixture with a desired density. To obtain a large difference in density, and thus a high sensitivity to accelerations, the use of the combination water and air bubble is advantageous. (different embodiment).

Both droplet and surrounding fluid are inserted after fabrication of the chamber with electrodes. The droplet may be thrown in the chamber at random, as the system aligns itself automatically upon application of the voltages on the electrodes, i.e. activation of the spring system. This initialization process may be helped somewhat by applying a hydrophobic layer 112 (e.g. Teflon) above the bottom electrodes as is shown in FIG. 6A.

The choice for a certain combination of droplet and surrounding fluid, does not influence the design of the chamber, so that the same chamber may be used to produce accelerometers with different responses, i.e. "custom made" accelerometers can be made.

In the above embodiment the same electrodes are used to control the springs, i.e. by applying an ac and/or dc potential difference, and to measure the displacements, i.e. by measuring the ac current that will flow through the capacitors as a result of the application of an ac potential difference.

Figure 8:
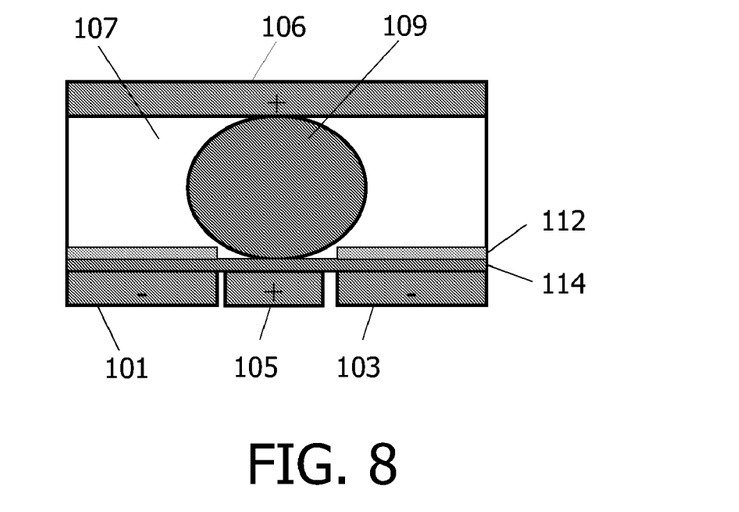
FIG. 8 shows a schematic representation of a cross-sectional view of an alternative to the accelerometer in FIG. 6, based on the principle of electrowetting.

In an alternative embodiment in FIG. 8 a water droplet is centered in the chamber filled with oil by applying a voltage over a center electrode (5) and the top electrode (6). In this case electrodes 5 and 6 control the spring system, while the displacement measurement is performed using the bottom electrodes 1 to 4 and electrode 6.

Figure 9:
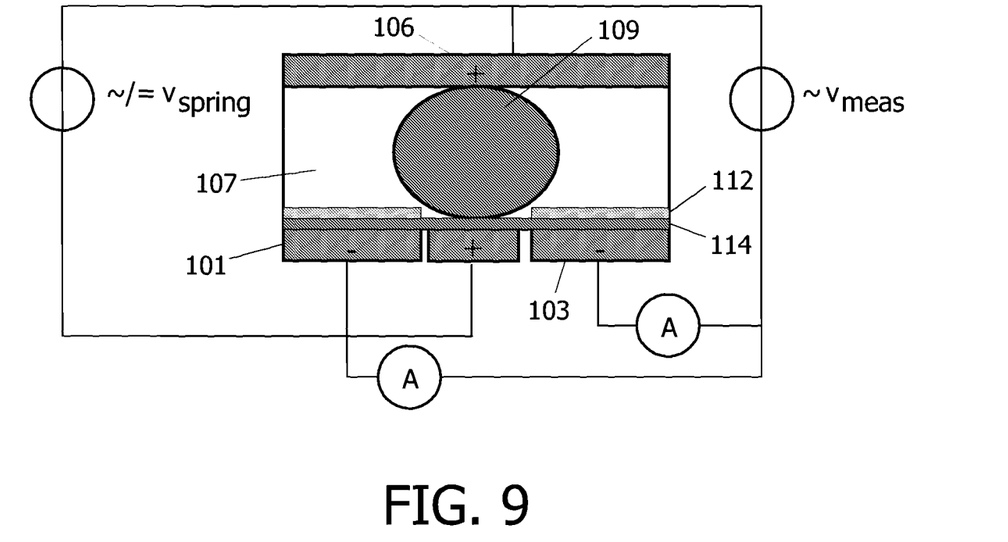
FIG. 9 shows the measurement set-up for the control of the spring system and measurement of the displacement.

FIG. 9 shows the control of the spring system and measurement of the displacement in detail. The current amplitude is measured, which is indicative for the displacement of the test mass.

Figure 10:
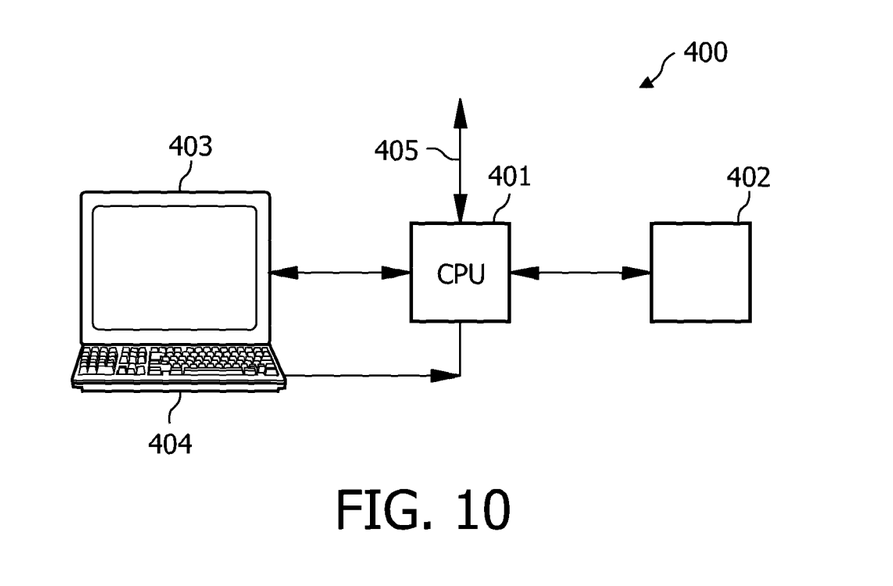
FIG. 10 shows an exemplary embodiment of a processing device adapted for executing an exemplary embodiment of a method in accordance with the present invention.

FIG. 10 depicts an exemplary embodiment of a data processing device 400 according to the present invention for executing an exemplary embodiment of a method in accordance with the present invention. The data processing device 400 depicted in FIG. 10 comprises a central processing unit (CPU) or processor 401 connected to a memory 402 for storing measured data. The data processor 401 may be connected to a plurality of input/output network or diagnosis devices, such as a accelerometer. The data processor 401 may furthermore be connected to a display device 403, for example, a computer monitor, for displaying information computed or adapted in the data processor 401. An operator or user may interact with the data processor 401 via a keyboard 404 and/or other output devices, which are not depicted in FIG. 10, for example for adjusting a voltage and therefore adjusting (in situ) the dynamic range of the accelerometer (for example from linear to logarithmic).

The accelerometer according to the present invention may be used to measure the accelerations inside a camcorder, to be able to remove the trembling of the user from the recording. Another embodiment is to detect that a device is falling, to be able to shut it down before it hit's the ground such that the device is more likely to survive (portable HDD MP3 payers).

The accelerometer may also be used in biomedical applications.

For instance it can be used in position sensing for (home) rehabilitation. The accelerometer can be used to determine how the limbs of a patient move in space in order to control whether the patient makes the right movements during home rehabilitation. Afterwards it can be decided if the rehabilitation is effective.

Alternatively, the accelerometer can be used in position sensing for a medical instrument, e.g. for minimally invasive surgery. The absolute position of the medical instrument can be determined and combined with imaging techniques, such as MRI.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A dielectrophoretic accelerometer for determining an acceleration acting on a test mass, the accelerometer comprising:
   a cavity filled with a medium;
   a source for generating a non-uniform electric field;
   a test mass adapted for moving inside the medium and being exposed to the non-uniform electric field;
   a detector adapted for detecting a movement of the test mass;
   wherein the accelerometer is adapted for determining an acceleration of the accelerometer on the basis of the movement of the test mass, and wherein the source is adapted for controlling a potential difference between a first electrode and a second electrode, resulting in an adjustment of a force acting on the test mass upon movement of the test mass.

2. The accelerometer of claim 1,
   wherein the first and second electrodes are adapted for generating the non-uniform electric field.

3. The accelerometer of claim 2,
   wherein the first and second electrodes are arranged in one of an upper horizontal plane and a lower horizontal plane.

4. The accelerometor as claimed in claim 2, wherein one or more of the second electrodes are provided with an electrically insulating layer.

5. The accelerometer as claimed in claim 4, wherein on the electrically insulating layer a hydrophobic layer is present.

6. The accelerometer of claim 1,
   wherein the medium has a first dielectric constant;
   wherein the test mass has a second dielectric constant, which is different from the first dielectric constant.

7. The accelerometer of claim 1,
   wherein the detector is adapted for capacitively detecting the movement of the test mass.

8. The accelerometer of claim 7,
   wherein the detector is adapted for detecting the movement of the test mass on the basis of a differential measurement; and
   wherein the movement of the test mass is detected by measuring a first capacity of a first electrode pair and a second capacity of a second electrode pair and by comparing the first capacity with the second capacity.

9. The accelerometer of claim 1,
   wherein the detector is adapted for performing a two-dimensional or a three-dimensional measurement by detecting a first movement of the test mass in a first direction and at least one of a second movement of the test mass in a second direction and a third movement of the test mass in a third direction.

10. The accelerometer of claim 1,
    wherein the test mass is a spherical particle.

11. The accelerometer of claim 1,
    wherein a non-uniformity of the electric field results in a logarithmic response of a force acting on the test mass upon movement of the test mass, resulting in a wide dynamic range of the acceleration to be measured.

12. The accelerometer of claim 11,
    wherein the source is adapted for switching the response from a non-linear response to a linear response.

13. The accelerometer of claim 1,
    wherein the test mass comprises one of polystyrene, latex, silicon, a first fluid, and a first gas; and
    wherein the medium comprises one of water, oil, a second fluid, and a second gas.

14. The accelerometor as claimed in claim 1, wherein the test mass is movable based on an electrowetting effect.

15. Use of the accelerometer of claim 1 inside a camcorder for measuring an acceleration inside the camcorder.

16. Use of the accelerometer of claim 1 inside a portable audio player for detecting when the audio player is falling.

17. Use of the accelerometer of claim 1 in biomedical applications.

18. A method of determining an acceleration acting on a test mass by a dielectrophoretic accelerometer, comprising:
    generating a non-uniform electric field;
    detecting a movement of the test mass adapted for moving inside a medium and being exposed to the non-uniform electric field;
    determining an acceleration of the accelerometer on the basis of the movement of the test mass, wherein a source is adapted for controlling a potential difference between a first electrode and a second electrode, resulting in an adjustment of a force acting on the test mass upon movement of the test mass.

19. A computer-readable medium, in which a computer program for determining an acceleration acting on a test mass by a dielectrophoretic accelerometer is stored which, when being executed by a processor, is adapted to carry out acts comprising:
    generating a non-uniform electric field;
    detecting a movement of the test mass adapted for moving inside a medium and being exposed to the force field;
    determining an acceleration of the accelerometer on the basis of the movement of the test mass, wherein a source is adapted for controlling a potential difference between a first electrode and a second electrode, resulting in an adjustment of a force acting on the test mass upon movement of the test mass.

* * * * *